(12) United States Patent
Gao et al.

(10) Patent No.: US 11,308,939 B1
(45) Date of Patent: Apr. 19, 2022

(54) WAKEWORD DETECTION USING MULTI-WORD MODEL

(71) Applicant: Amazon Technologies, Inc., Seattle, WA (US)

(72) Inventors: Yixin Gao, Cambridge, MA (US); Ming Sun, Winchester, MA (US); Varun Nagaraja, Cambridge, MA (US); Gengshen Fu, Sharon, MA (US); Chao Wang, Newton, MA (US); Shiv Naga Prasad Vitaladevuni, Cambridge, MA (US)

(73) Assignee: Amazon Technologies, Inc., Seattle, WA (US)

( * ) Notice: Subject to any disclaimer, the term of this patent is extended or adjusted under 35 U.S.C. 154(b) by 50 days.

(21) Appl. No.: 16/140,737

(22) Filed: Sep. 25, 2018

(51) Int. Cl.
| | |
|---|---|
| *G10L 15/14* | (2006.01) |
| *G10L 15/22* | (2006.01) |
| *G06F 3/16* | (2006.01) |
| *G10L 15/08* | (2006.01) |

(52) U.S. Cl.
CPC ............ *G10L 15/142* (2013.01); *G06F 3/167* (2013.01); *G10L 15/22* (2013.01); *G10L 2015/088* (2013.01); *G10L 2015/223* (2013.01)

(58) Field of Classification Search
None
See application file for complete search history.

(56) References Cited

U.S. PATENT DOCUMENTS

| | | | | |
|---|---|---|---|---|
| 5,199,077 | A * | 3/1993 | Wilcox | G10L 15/142 |
| | | | | 704/243 |
| 7,720,683 | B1 * | 5/2010 | Vermeulen | G10L 15/22 |
| | | | | 704/254 |
| 8,352,265 | B1 * | 1/2013 | Lin | G10L 15/142 |
| | | | | 704/256.6 |
| 9,159,319 | B1 * | 10/2015 | Hoffmeister | G10L 15/08 |
| 9,548,053 | B1 * | 1/2017 | Basye | G06F 16/683 |
| 10,127,904 | B2 * | 11/2018 | Rao | G06N 3/084 |
| 10,304,440 | B1 * | 5/2019 | Panchapagesan | G10L 15/16 |
| 10,460,722 | B1 * | 10/2019 | Sun | G06N 7/005 |
| 10,460,729 | B1 * | 10/2019 | Sun | G10L 15/16 |
| 10,510,340 | B1 * | 12/2019 | Fu | G10L 15/22 |
| 2003/0200086 | A1 * | 10/2003 | Kawazoe | G10L 15/20 |
| | | | | 704/239 |
| 2003/0200090 | A1 * | 10/2003 | Kawazoe | G10L 15/00 |
| | | | | 704/251 |
| 2003/0220792 | A1 * | 11/2003 | Kobayashi | G10L 15/08 |
| | | | | 704/256.4 |
| 2005/0010412 | A1 * | 1/2005 | Aronowitz | G10L 15/02 |
| | | | | 704/254 |
| 2006/0190259 | A1 * | 8/2006 | Jeong | G10L 15/08 |
| | | | | 704/256 |
| 2007/0136058 | A1 * | 6/2007 | Jeong | G10L 15/08 |
| | | | | 704/240 |

(Continued)

*Primary Examiner* — Jonathan C Kim
(74) *Attorney, Agent, or Firm* — Pierce Atwood LLP

(57) ABSTRACT

A system and method performs wakeword detection and automatic speech recognition using the same acoustic model. A mapping engine maps phones/senones output by the acoustic model to phones/senones corresponding to the wakeword. A hidden Markov model (HMM) may determine that the wakeword is present in audio data; the HMM may have multiple paths for multiple wakewords or may have multiple models. Once the wakeword is detected, ASR is performed using the acoustic model.

19 Claims, 15 Drawing Sheets

(56) References Cited

U.S. PATENT DOCUMENTS

| | | | |
|---|---|---|---|
| 2008/0059188 A1* | 3/2008 | Konopka | G10L 15/22 704/257 |
| 2010/0094626 A1* | 4/2010 | Li | G10L 15/10 704/234 |
| 2011/0218804 A1* | 9/2011 | Chun | G10L 15/144 704/243 |
| 2014/0025379 A1* | 1/2014 | Ganapathiraju | G10L 15/08 704/255 |
| 2014/0169795 A1* | 6/2014 | Clough | G08C 23/04 398/106 |
| 2014/0214416 A1* | 7/2014 | Yue | G10L 15/083 704/231 |
| 2014/0236600 A1* | 8/2014 | Lu | G10L 15/063 704/251 |
| 2014/0337030 A1* | 11/2014 | Lee | G10L 15/22 704/251 |
| 2015/0095032 A1* | 4/2015 | Li | G10L 15/08 704/255 |
| 2017/0116994 A1* | 4/2017 | Wang | G10L 15/22 |
| 2017/0148429 A1* | 5/2017 | Hayakawa | G10L 15/02 |
| 2017/0148444 A1* | 5/2017 | Bocklet | G06F 40/284 |
| 2017/0256255 A1* | 9/2017 | Bocklet | G06F 16/685 |
| 2017/0270919 A1* | 9/2017 | Parthasarathi | G10L 15/02 |
| 2017/0301341 A1* | 10/2017 | Tyagi | G10L 15/14 |
| 2017/0365251 A1* | 12/2017 | Park | G10L 15/14 |
| 2018/0005633 A1* | 1/2018 | Bocklet | G10L 17/18 |
| 2018/0075843 A1* | 3/2018 | Hayakawa | G10L 15/08 |
| 2018/0232201 A1* | 8/2018 | Holtmann | G01S 5/28 |
| 2018/0233150 A1* | 8/2018 | Gruenstein | G10L 15/30 |
| 2018/0268809 A1* | 9/2018 | Fujimura | G10L 15/02 |
| 2018/0293221 A1* | 10/2018 | Finkelstein | G10L 17/10 |
| 2018/0293981 A1* | 10/2018 | Ni | G06F 21/32 |
| 2019/0043481 A1* | 2/2019 | Georges | G10L 15/063 |
| 2019/0043488 A1* | 2/2019 | Bocklet | G06N 7/005 |
| 2019/0043503 A1* | 2/2019 | Bauer | G10L 15/02 |
| 2019/0266240 A1* | 8/2019 | Georges | G10L 15/142 |
| 2019/0311715 A1* | 10/2019 | Pfeffinger | G06F 3/167 |
| 2019/0318724 A1* | 10/2019 | Chao | G10L 15/14 |
| 2020/0090657 A1* | 3/2020 | Czarnowski | G06F 16/683 |
| 2020/0135186 A1* | 4/2020 | Huang | G10L 15/02 |
| 2020/0273447 A1* | 8/2020 | Zhou | G10L 15/063 |

* cited by examiner

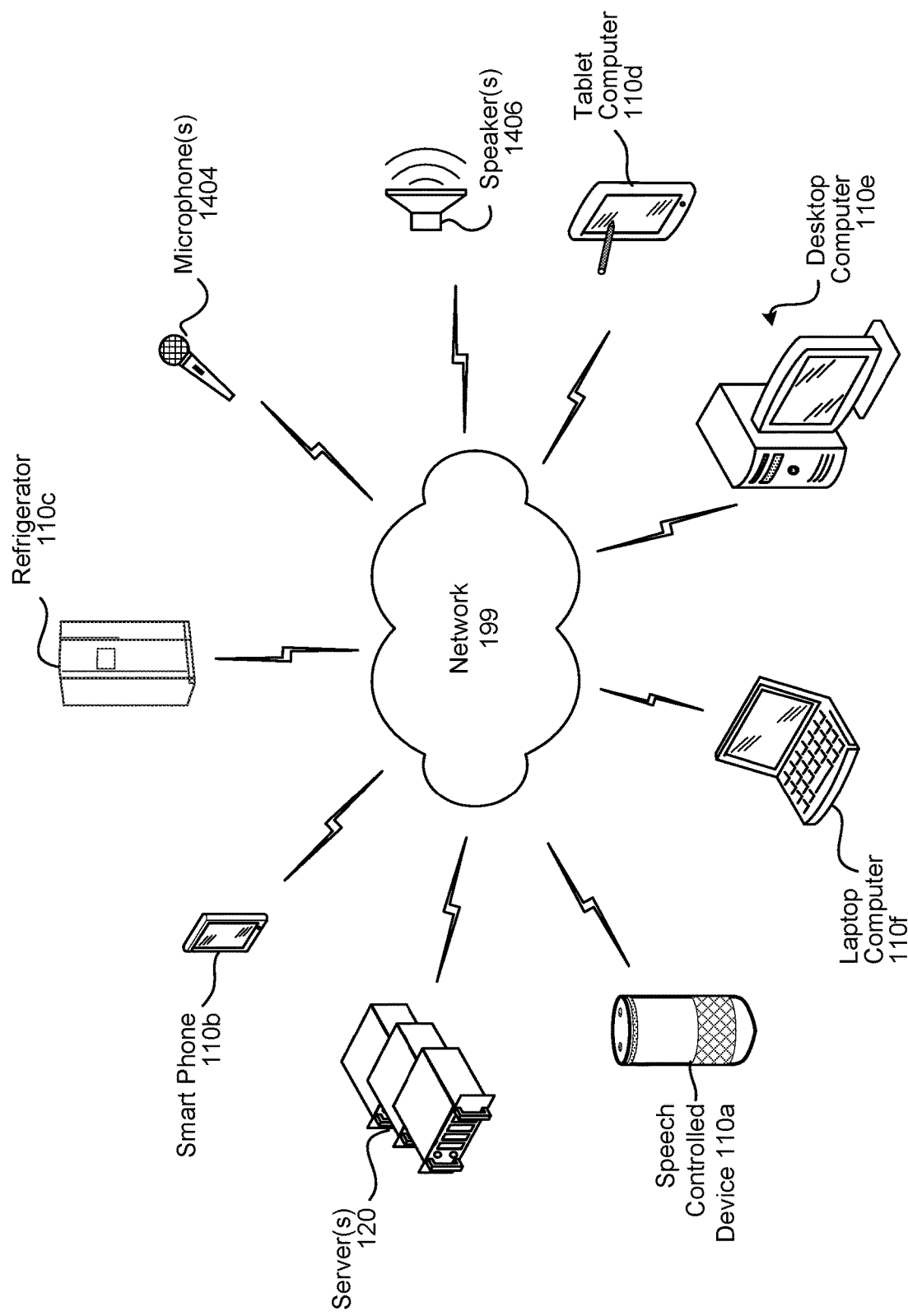

WAKEWORD DETECTION USING MULTI-WORD MODEL

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 14 illustrates an example of a computer network for use with the speech processing system.

DETAILED DESCRIPTION

Figure 1:
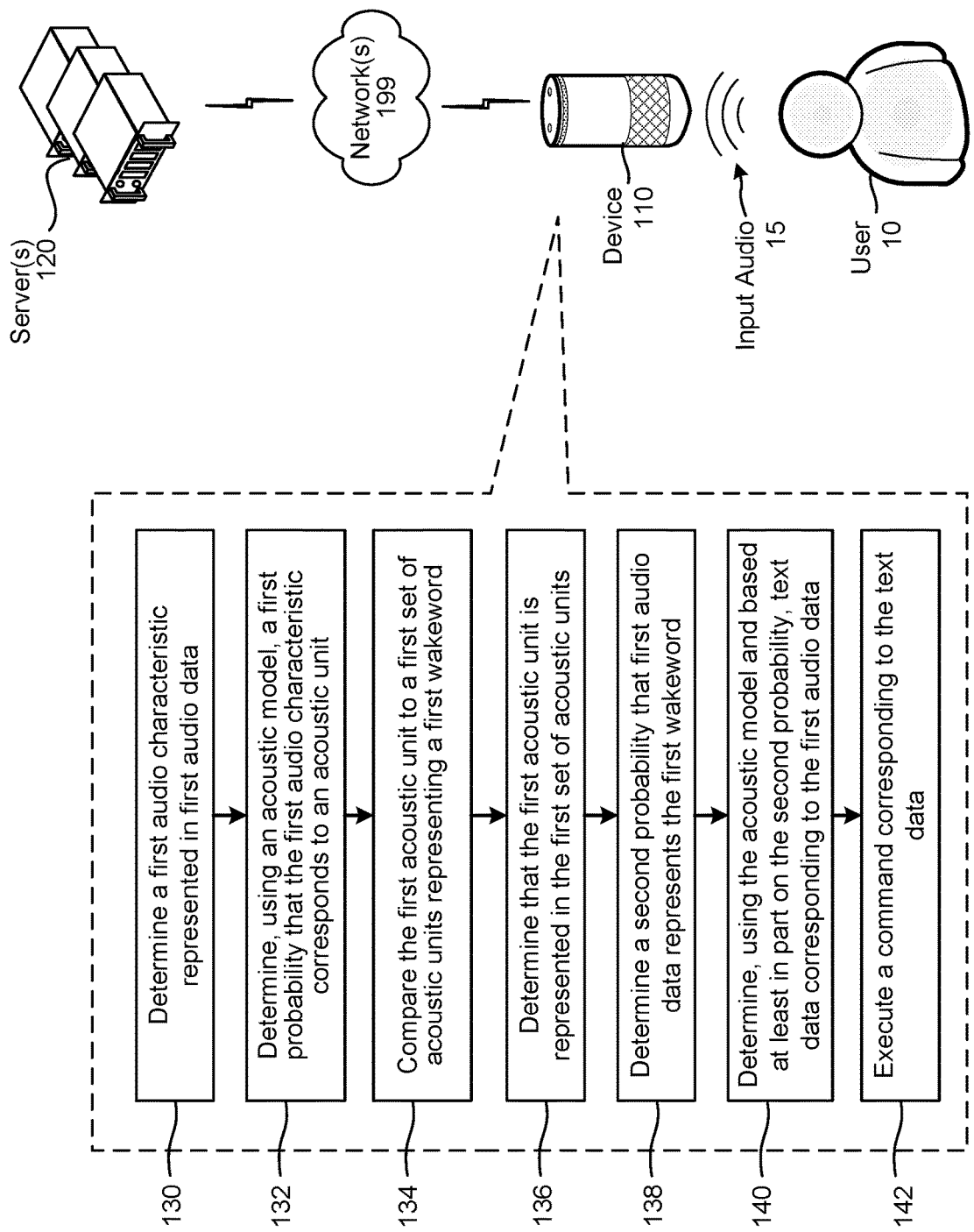
FIG. 1 illustrates a system for detecting a wakeword according to embodiments of the present disclosure.

Automatic speech recognition (ASR) is a field of computer science, artificial intelligence, and linguistics concerned with transforming audio data associated with speech into text representative of that speech. Natural language understanding (NLU) is a field of computer science, artificial intelligence, and linguistics concerned with enabling computers to derive meaning from text input containing natural language. ASR and NLU are often used together as part of a speech processing system.

Performing ASR and NLU to recognize and understand a full set of words and sentences may be computationally expensive. That is, significant computing resources may be needed to process ASR and NLU within a reasonable time frame. Because of this, a distributed computing environment may be used when performing speech processing. An example distributed environment may involve a local device having one or more microphones configured to capture sounds from a user speaking and convert those sounds into an audio signal. The audio signal/data may then be sent to a downstream remote device for further processing, to complete the transformation of the audio signal into an ultimate command. The command may then be executed by a combination of remote and local devices depending on the command itself.

A local device may be configured to activate upon a user speaking a particular command—i.e., a "wakeword"—to wake the local device so the user may speak a further command. The wakeword may include an indication for the system to perform further processing. The local device may continually listen for the wakeword and may disregard any audio detected that does not include the wakeword. Typically, systems are configured to detect a wakeword, and then process any subsequent audio following the wakeword (plus perhaps a fixed, but short amount of audio pre-wakeword) to detect any commands in the subsequent audio. As an example, a wakeword may include a name by which a user refers to a device. Thus, if the wakeword is "Alexa," a user may command a local voice-controlled device to play music by saying "Alexa, play some music." The device, recognizing the wakeword "Alexa" would understand the subsequent audio (in this example, "play some music") to represent a command of some sort and would send audio data corresponding to that subsequent audio (as well as potentially to the wakeword and some buffered audio prior to the wakeword) to a remote device (or maintain it locally) to perform speech processing on that audio to determine what the command is for execution. Provided services/commands may include performing actions or activities, rendering media, obtaining and/or providing information, providing information via generated or synthesized speech via a local device, initiating Internet-based services on behalf of the user, and so forth.

The local device may include its own ASR system for detecting a subset of words corresponding to a subset of commands. Because, as described above, performing ASR may be computationally expensive, the local ASR system detects only the subset of words. For example, the full ASR system operating on the remote device may be capable of detecting 10,000 different sounds corresponding to words or parts of words, or "acoustic units"; the local ASR system, in contrast, may be capable of detecting only 3,000-4,000 acoustic units. The acoustic units may be, in some embodiments, phones, phonemes, diphones, triphones, senones, or any other acoustic unit. A phone may refer to any acoustic unit; a phoneme may refer to an acoustic unit that, if swapped with another phoneme, would change the meaning of a corresponding word. A diphone may refer to an adjacent pair of phonemes, and a triphone may refer to three adjacent phonemes. A senone may refer to an acoustic realization of a phone or phoneme. The local ASR system may be capable of determining that acoustic units correspond to commands that do not require sophisticated processing, such as raising or lowering a volume level of device with "Alexa, volume up" and "Alexa, volume down."

The present disclosure improves voice-controlled devices by re-using a first acoustic model configured for limited ASR processing for use with wakeword detection, thereby removing the need for a second acoustic model dedicated for wakeword detection. The voice-controlled device may detect multiple (i.e., two or more) wakewords by analyzing acoustic units in audio data using different wakeword detection models, such as hidden Markov models (as explained in greater detail below). The voice-controlled device may associate the different wakewords with different modes of operation, such as a first wakeword for general commands and requests and a second wakeword for device-specific commands and requests, such as commands and requests corresponding to an automobile voice interface.

FIG. 1 illustrates how a device 110 may use an ASR acoustic model for both wakeword detection and ASR and how, using this configuration, different wakewords may be detected. Although the figures and discussion illustrate certain operational steps of the system in a particular order, the steps described may be performed in a different order (as well as certain steps removed or added) without departing from the intent of the disclosure. A device 110 local to a user 10 and one or more server(s) 120 may communicate across one or more networks 199. The device 110 may receive input audio 15 from a user 10 and may perform wakeword detection and/or ASR using the input audio 15. The device 110 may further send audio data representing the input audio 15 to the server(s) 120 via the network 199. The server(s) 120 may perform additional speech processing (e.g., ASR and NLU) on the audio data to determine output data responsive to an utterance represented in the audio data. The device 110 may receive the output data from the server(s) 120 and output content corresponding to the output data.

The device 110 may determine (130) a first audio characteristic represented in first audio data and determine (132), using an acoustic model, a first probability that the first audio characteristic corresponds to an acoustic unit. The device 110 may compare (134) the first acoustic unit to a first set of acoustic units that represents a first wakeword and determine (136) that the acoustic unit corresponds to a first set of acoustic unit representing a first wakeword and determine (138) a second probability that first audio data represents the first wakeword. The device 110 may determine (140), using the acoustic model and based at least in part on the second probability, text data corresponding to the first audio data and may execute (142) executing a command corresponding to the text data.

The device 110 may use various techniques to determine whether the first audio data includes speech. For example, the device 110 may apply voice activity detection (VAD) techniques executed by a VAD/beam selection component of the device 110. Such VAD techniques may determine whether speech is present in the first audio data based on various quantitative aspects of the first audio data, such as the spectral slope between one or more frames of the first audio data, the energy levels of the first audio data in one or more spectral bands the signal-to-noise ratios of the first audio data in one or more spectral bands; or other quantitative aspects. In other examples, the device 110 may implement a trained classifier configured to distinguish speech from background noise. The classifier may be implemented by techniques such as linear classifiers, support vector machines, and decision trees. In still other examples, Hidden Markov Model (HMM) or Gaussian Mixture Model (GMM) techniques may be applied to compare the first audio data to one or more acoustic models in speech storage, which acoustic models may include models corresponding to speech, noise (e.g., environmental noise or background noise), or silence. Still other techniques may be used to determine whether speech is present in the first audio data.

Once speech is detected in the first audio data, a wakeword detection component of the device 110 may detect if a wakeword is represented in the first audio data. An illustrative wakeword is "Alexa."

A speech recognition engine may use a number of techniques to match audio feature vectors to acoustic unit, for example using Hidden Markov Models (HMMs) to determine probabilities that audio feature vectors may match acoustic unit. Sounds received may be represented as paths between states of the HMM and multiple paths may represent multiple possible text matches for the same sound. Each acoustic unit may have a number of different sounds depending on its context (e.g., the surrounding acoustic units). English, for example, may have approximately 50 phonemes, it has several thousand senones. Use of senones in ASR processing may allow for improved ASR results.

Figure 2:
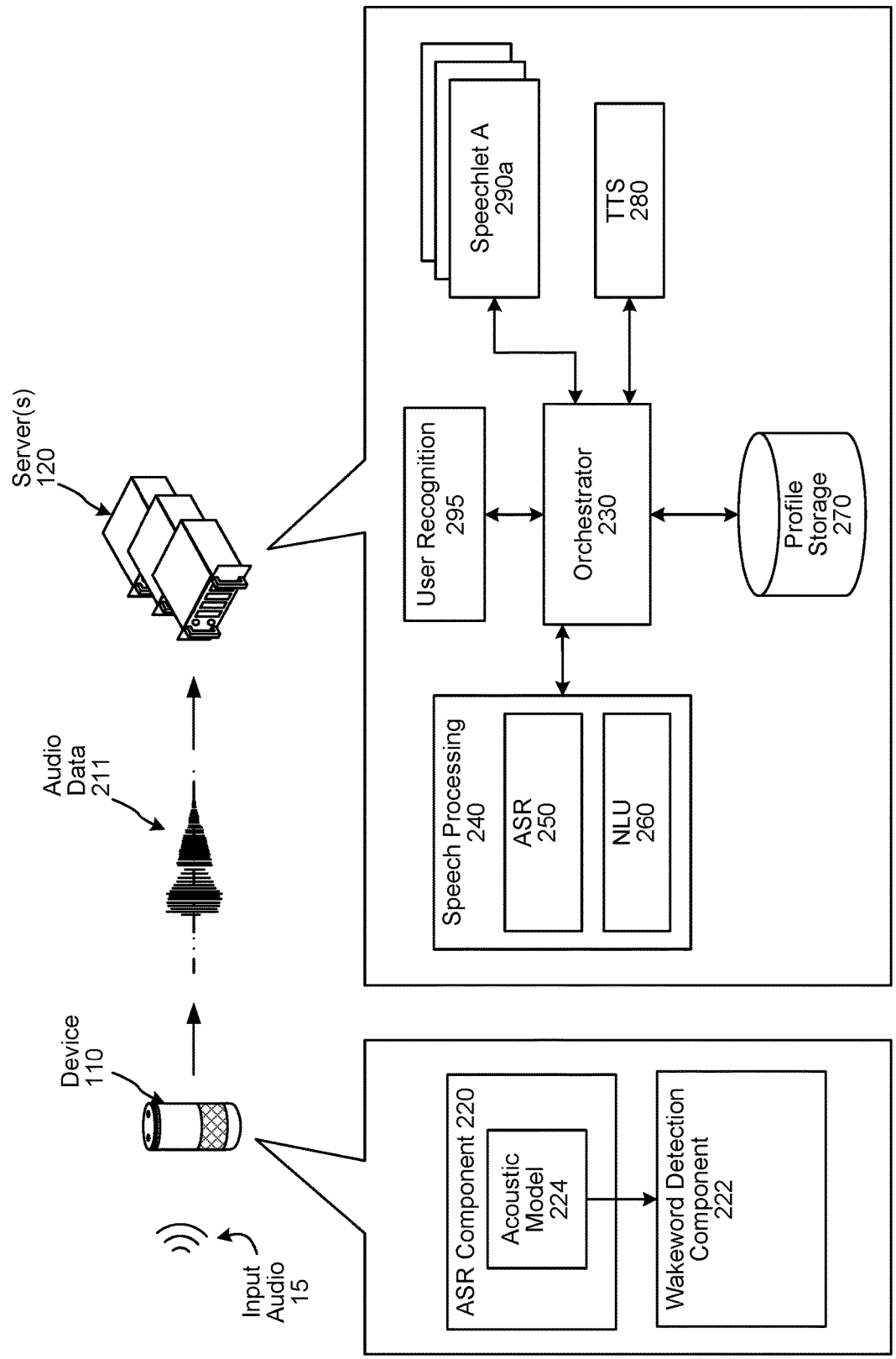
FIG. 2 illustrates components of a system for detecting a wakeword according to embodiments of the present disclosure.

The system may operate using various components as described in FIG. 2. The various components may be located on a same or different physical devices. Communication between various components may occur directly or across a network(s) 199.

The device 110 may receive audio 15 using an audio capture component, such as a microphone or array of microphones. The device 110 may use VAD techniques to determine if audio data, corresponding to the audio 15, includes speech. If the device 110 determines the audio data includes speech, a wakeword detection component 222 may process the audio data to determine if a wakeword is represented therein. Following detection of a wakeword, the device 110 sends audio data 211, corresponding to at least an utterance following the wakeword in the audio data, to the server(s) 120. The device 110 may further include an ASR component 220 for determining speech represented in the input audio 15. The wakeword detection component 222 and the ASR component 220 may use the same acoustic model 224.

The wakeword detection component 222 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 222 may be built on deep neural network (DNN)/recursive neural network (RNN) structures directly, without HMM involved. Such wakeword detection component 222 may estimate the posteriors of wakewords with context information, either by stacking frames within a context window for DNN, or using RNN. Follow-on posterior threshold tuning or smoothing is applied for decision making. Other techniques for wakeword detection may also be used.

Upon receipt by the server(s) 120, the audio data 211 may be sent to an orchestrator component 230. The orchestrator component 230 may include memory and logic that enables the orchestrator component 230 to transmit various pieces and forms of data to various components of the system.

The orchestrator component 230 sends the audio data 211 to a speech processing component 240. An ASR component 250 of the speech processing component 240 transcribes the audio data 211 into text data representing one more hypotheses representing speech contained in the audio data 211. The ASR component 250 interprets the utterance in the audio data 211 based on a similarity between the utterance and pre-established language models. For example, the ASR component 250 may compare the audio data 211 with models for sounds (e.g., subword units, such as phonemes, etc.) and sequences of sounds to identify words that match the sequence of sounds spoken in the utterance represented in the audio data 211. The ASR component 250 sends (either directly or via the orchestrator component 230) the text data generated thereby to an NLU component 260 of the speech processing component 240. The text data output by the ASR component 250 may include a top scoring hypothesis or may include an N-best list including multiple hypotheses. An N-best list may additionally include a score associated with each hypothesis represented therein. Each score may indicate a confidence of ASR processing performed to generate the hypothesis with which it is associated.

The NLU component 260 attempts to make a semantic interpretation of the phrases or statements represented in the text data input thereto. That is, the NLU component 260 determines one or more meanings associated with the phrases or statements represented in the text data based on individual words represented in the text data. The NLU component 260 determines an intent (e.g., a system action that a user desires the system to perform) representative of text data as well as pertinent pieces of information in the text data that allow a device (e.g., the device 110, the server(s) 120, etc.) to execute the intent. For example, if the text data corresponds to "play Toto," the NLU component 1060 may determine a user intended the system to output music performed by the band Toto, which the NLU component 260 determines is represented by a <PlayMusic> intent.

The orchestrator component 230 (or another component of the server(s) 120) may send NLU results data to a speechlet component 290 associated with the intent. The speechlet component 290 determines output data based on the NLU results data. For example, if the NLU results data includes intent data corresponding to <PlayMusic> and tagged text corresponding to <Artist: Toto>, the orchestrator 230 (or other component of the server(s) 120) may send the NLU results data to a music speechlet component, which determines Toto music audio data for output by the system.

A "speechlet" may be software running on the server(s) 120 that is akin to an application. That is, a speechlet may enable the server(s) 120 to execute specific functionality in order to provide data or produce some other output requested by a user. The server(s) 120 may be configured with more than one speechlet. For example, a weather speechlet may enable the server(s) 120 to provide weather information, a ride sharing speechlet may enable the server(s) 120 to book a trip with respect to a taxi or ride sharing service, an food order speechlet may enable the server(s) 120 to order a pizza with respect to a restaurant's online ordering system, etc.

In some instances, a speechlet 290 may provide output text data responsive to received NLU results data. The server(s) 120 may include a text-to-speech (TTS) component 280 that generates output audio data from speechlet provided output text data. The TTS component 280 may use different synthesis techniques. In one method of synthesis called unit selection, the TTS component 280 analyzes text data against a database of recorded speech. The TTS component 280 selects units of recorded speech matching the text data and concatenates the units together to form output audio data. In another method of synthesis called parametric synthesis, the TTS component 280 varies parameters such as frequency, volume, and noise to create output audio data including an artificial speech waveform. Parametric synthesis uses a computerized voice generator, sometimes called a vocoder.

The server(s) 120 may include a user-recognition component 295. The user recognition component 295 may receive as input the audio data 211 and/or input text data output by the ASR component 250. The user recognition component 295 determines scores indicating whether the speech represented in the audio data 211 originated from a particular user. For example, a first score may indicate a likelihood that the speech originated from a first user, a second score may indicate a likelihood that the speech originated from a second user, etc. The user recognition component 295 also determines an overall confidence regarding the accuracy of user recognition operations. The user recognition component 295 may perform user recognition by comparing audio characteristics in the audio data 211 to stored audio characteristics of users. The user recognition component 295 may also perform user recognition by comparing biometric data (e.g., fingerprint data, iris data, etc.) received by the system in correlation with the audio 15 to stored biometric data of users. The user recognition component 295 may further perform user recognition by comparing image data (e.g., including a representation of at least a feature of a user) received by the system in correlation with the audio 15 with stored image data (e.g., including representations of features of users). The user recognition component 295 may perform additional user recognition processes. Output of the user recognition component 295 may be used to inform NLU processing as well as processing performed by speechlets 290.

The server(s) 120 may include a user profile storage 270. The user profile storage 270 may include a variety of information related to individual users, groups of users, etc. that interact with the system. The user profile storage 270 may include one or more customer profiles. Each customer profile may be associated with a different customer ID. A customer profile may be an umbrella profile specific to a group of users. That is, a customer profile encompasses two or more individual user profiles, each associated with a respective user ID. For example, a customer profile may be a household profile that encompasses user profiles associated with multiple users of a single household. A customer profile may include preferences shared by all the user profiles encompassed thereby. Each user profile encompassed under a single customer profile may include preferences specific to the user associated therewith. That is, each user profile may include preferences unique from one or more other user profiles encompassed by the same customer profile. A user profile may be a stand-alone profile or may be encompassed under a customer profile. As illustrated, the user profile storage 270 is implemented as part of the server(s) 120. However, it should be appreciated that the user profile storage 270 may be in communication with the server(s) 120, for example over the network(s) 199. User profile data may be used to inform NLU processing as well as processing performed by speechlet 290.

As described above, the wakeword detection component 222 may implement device specific and/or user specific machine learned models. However, one skilled in the art will appreciate that one or more machine learned models may be trained using both device specific speech processing data and user specific speech processing data. The more data types used to train a machine learning model, the more accurate a resulting trained model will be in predicting whether the wakeword detection sensitivity should be lowered. For example, other data that may be used to train a machine learning model includes a type of the device 110, a location of the device 110 (e.g., a geographic location or a location with a building), etc.

Users may routinely speak a first wakeword followed by a first command to a device and thereafter speak a second wakeword followed by a second command to the device. Moreover, an intent of the first command may indicate to the system that the device is likely to receive the second wakeword and second command. For example, a user may routinely say "Alexa, play [artist name]," with "Alexa" corresponding to a first wakeword and "play [artist name]" corresponding to a <PlayMusic> intent. After a user speaks such, it may be routine that the user says "Alexa, [increase or decrease] the volume," with "Alexa" corresponding to a second wakeword and "play [increase or decrease] the volume" corresponding to a <ChangeVolume> intent. Since the user routinely speaks the command corresponding to the <ChangeVolume> intent after the user speaks the command corresponding to the <PlayMusic> intent, the system may infer that the wakeword detection sensitivity should be lowered when the system determines a command corresponding to a <PlayMusic> intent.

In some implementations, the server(s) 120 may receive input audio data from the device 110 as well as receive an indication from the device 110 that the device 110 detected a wakeword. The server(s) 120 may perform processes to determine if a wakeword is present in the input audio data using a model trained using data accessible to the server(s) 120. This may be beneficial if the device 110a performs unreliable wakeword detection or less reliable wakeword detection than the server(s) 120.

The aforementioned models and other models described herein, which are implemented by components of the system may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning component may include establishing a "ground truth" for training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 3:
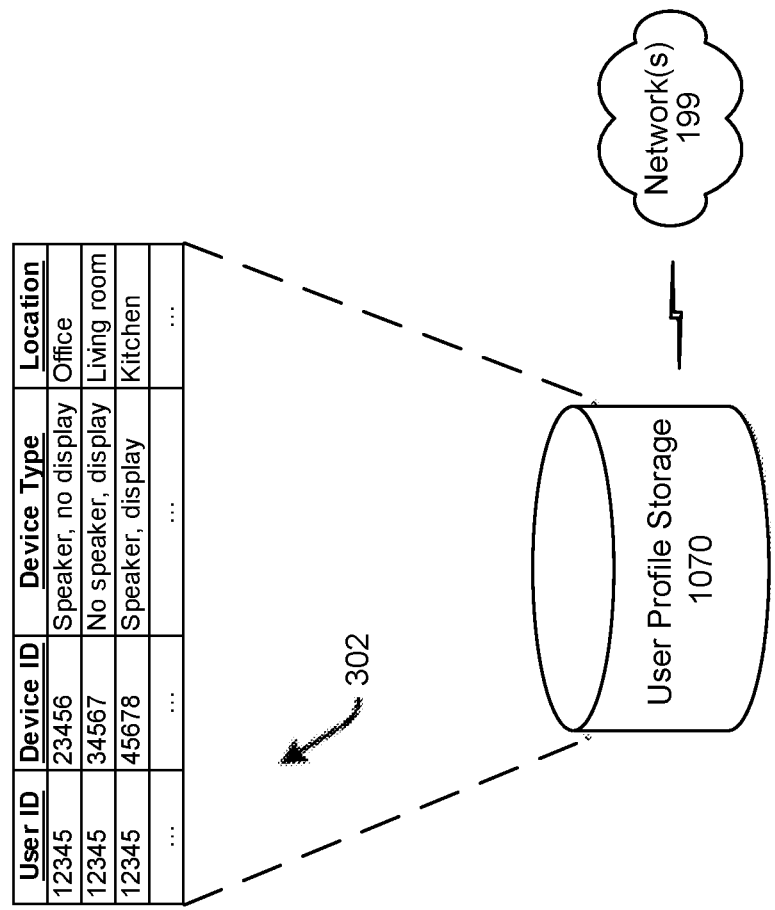
FIG. 3 illustrates data stored and associated with user profiles according to embodiments of the present disclosure.

FIG. 3 illustrates the user profile storage 270 that includes data regarding customer profiles as well as individual user profiles 302. Each user profile 302 may include information indicating various devices, output capabilities of each of the various devices, and a location of each of the various devices. Each user profile 302 may additionally include other data not explicitly illustrated.

Device profile data represents a profile specific to a device. For example, device profile data may represent various user profiles that are associated with the device, speech processing that was performed with respect to audio data received from the device, instances when the device detected a wakeword, etc. In contrast, user profile data represents a profile specific to a user. For example, user profile data may represent various devices associated with the user, etc.

Figure 4A:
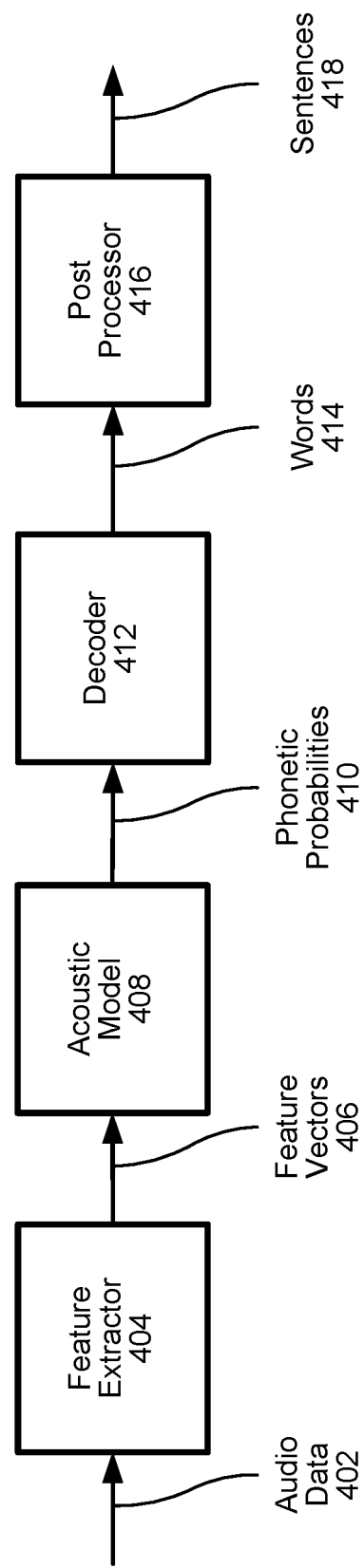
FIGS. 4A and 4B illustrate speech-recognition systems according to embodiments of the present disclosure.
Figure 4B:
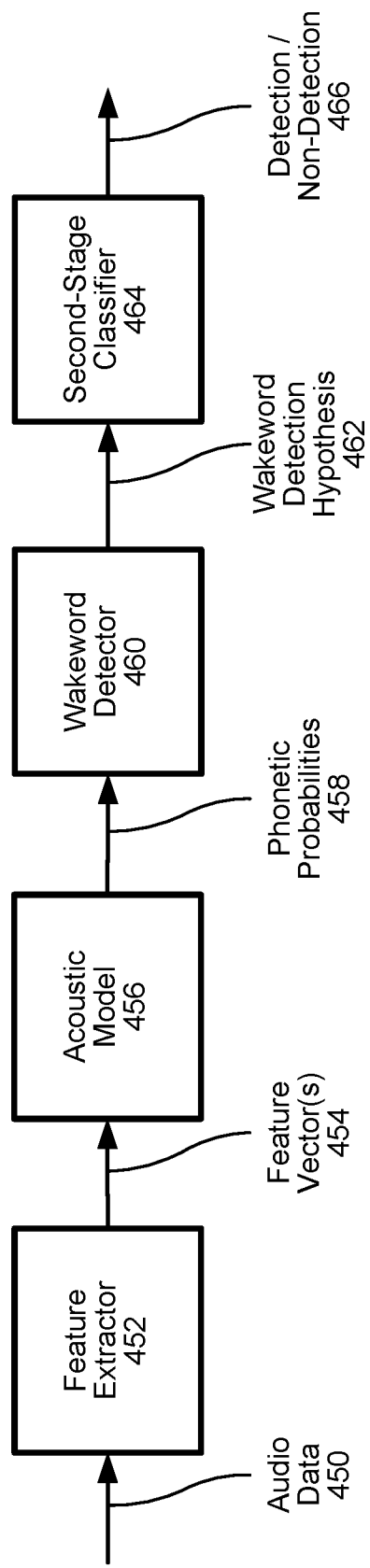

FIGS. 4A and 4B illustrate systems for speech processing. Referring first to FIG. 4A, a system for performing automatic speech recognition includes a feature extractor 404 that receives audio data 402 corresponding to an utterance and outputs one or more feature vectors 406 that represent one or more features of the audio data 402. The audio data 402 may be a time-domain, digital representation of corresponding audio, which may include an utterance. The feature extractor 404 may be, for example, a convolutional recurrent neural network (CRNN) or other such model. The feature extractor 404 may be configured to extract, from the input audio data 402, feature data 406 corresponding to features that may be relevant to audio classification and/or other operations performed by other components. The feature extractor 61 404 may include a convolutional recurrent neural network (CRNN), convolutional neural network (CNN), other neural network, or other trained model acting as a feature extractor. The audio feature data 406 may correspond to a two dimensional feature map where one dimension corresponds to time and another dimension corresponds to feature data. Thus, for each time unit of feature data will include a number of feature data values for that time unit. Thus the audio feature data 406 may track a certain number of dimensions worth of feature data for each time unit. The resolution of each time unit for the audio feature data 406 may not necessarily be the same as the original input audio data 402. For example, one time unit of the audio feature data 406 may correspond to a longer time duration than an original audio frame (which may be the time unit for audio data 402). Thus, there may not be a one-to-one relationship between a unit of audio data 402 and a unit of audio feature data 406. For example, one time unit of the audio feature data 406 may correspond to eight audio data frames, four audio data frames, or a different time unit that does not correspond to an integer number of audio frames—various such time units are possible using the system. Thus each time unit of audio feature data 406 may include data corresponding to many different original audio data frames. The time resolution may depend on system configuration. The audio feature data 406 may be data in a time domain or frequency domain, may include binned data according to frequency ranges or time ranges, may include different configurations of features, etc. Configuration of the audio feature data 406 may also depend on configuration of the feature extractor 404.

The feature data o406 may correspond to one or more values in feature dimensions that may be used by other models in performing further operations. The feature data 406 may include values that represent features of the audio, such as timber, pitch, volume, or other such values; The feature data 406 may further include values that represent features of the audio that do not correspond directly to features such as timber, pitch, volume, or other such values. In certain instances the feature extractor 404 may be trained using a classifier so that the feature extractor 404 learns the feature data most useful to the later operations.

To produce the audio feature data 406, the feature extractor 404 may be configured as a CRNN. A residual network structure may be used as the convolutional network in the feature extractor CRNN, which may include two convolutional blocks. The feature extractor CRNN may include a number of layers. A bottom convolutional layer may input the audio data 402 and with a stride of (2,1) (meaning the layer may skip an output every two timestamps). The CRNN then may have a max pooling layer with a stride of (2,2) resulting in a 2× time dimensionality reduction and a 2× frequency reduction. The result of the max pooling is then processed by the next two convolutional blocks/residual network blocks (e.g., Cony 3×3, 64), the output of which is then processed by the next two convolutional blocks (Cony 3×3, 128). An average pooling block may then be used to further reduce the dimensionality before feeding into a bi-directional gated recurrent unit (GRU) layer to produce the audio feature data 406. The audio feature data 406 may have a time scale of 186 ms, e.g., eight times the resolution of an input spectrogram. The number of units in the feature data may correspond to the number of units in the bi-directional GRU layer of the CRNN.

An acoustic model 408 may receive the acoustic features 406 and output corresponding phonetic probabilities 410. The phonetic probabilities 410 may represent the different ways a spoken utterance may be interpreted (i.e., different hypotheses) and may assign a probability or a confidence score representing the likelihood that a particular set of words matches those spoken in an utterance. The phonetic probabilities 410 may be based on a number of factors including, for example, the similarity of the sound in the utterance to models for language sounds and the likelihood that a particular word that matches the sounds would be included in the sentence at the specific location (e.g., using a language or grammar model). Thus each potential textual interpretation of the spoken utterance (hypothesis) is associated with a confidence score. The acoustic model 408 may also output multiple hypotheses in the form of a lattice or an N-best list with each hypothesis corresponding to a confidence score or other score (such as probability scores, etc.).

The acoustic model 408 may include rules that may be used to assign specific audio waveform parameters to input acoustic units and/or corresponding prosodic annotations. The rules may be used to calculate a score representing a likelihood that a particular audio output parameter(s) (such as frequency, volume, etc.) corresponds to the portion of the input symbolic linguistic representation.

The acoustic model 408 may include one or more HMMs that may be used to determine the probabilities that audio output should match textual input. HMMs may be used to translate parameters from the linguistic and acoustic space to the parameters to be used by a vocoder (a digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts (such as the phoneme identity, stress, accent, position, etc.).

An initial determination of a probability of a potential phoneme may be associated with one state. As new text is processed, the state may change or stay the same, based on the processing of the new text. For example, the pronunciation of a previously processed word might change based on later processed words. A Viterbi algorithm may be used to find the most likely sequence of states based on the processed text. The HMMs may generate speech in parametrized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, HNM (harmonic plus noise model) based vocoders, CELP (code-excited linear prediction) vocoders, GlottHMM vocoders, HSM (harmonic/stochastic model) vocoders, or others.

A decoder 412 may receive the phonetic probabilities 410 and output corresponding words 414. The decoder 412 may be a model, as described above, trained to translate the phonetic probabilities 410 into the words 414 in accordance with training data. A post processor 416 may similarly be a trained model, as described above, to form sentences 418 from the words 414.

FIG. 4B illustrates a speech processing system for wakeword detection in accordance with embodiments of the present invention. With reference also to FIG. 4A, a feature extractor 452 receives audio data 450 and outputs corresponding feature vectors 454. An acoustic model 456 creates phonetic probabilities 458 using the feature vectors 454.

A wakeword detector 460 may output a wakeword detection hypothesis 462 using the phonetic probabilities 458. As explained in greater detail below, the wakeword detector 460 may include one or more HMMs. A second-stage classifier 464 may be used to create a determination of detection or non-detection 466 of the wakeword; in some embodiments, however, the wakeword detector 460 makes this determination without using the second-stage classifier 464.

Figure 5:
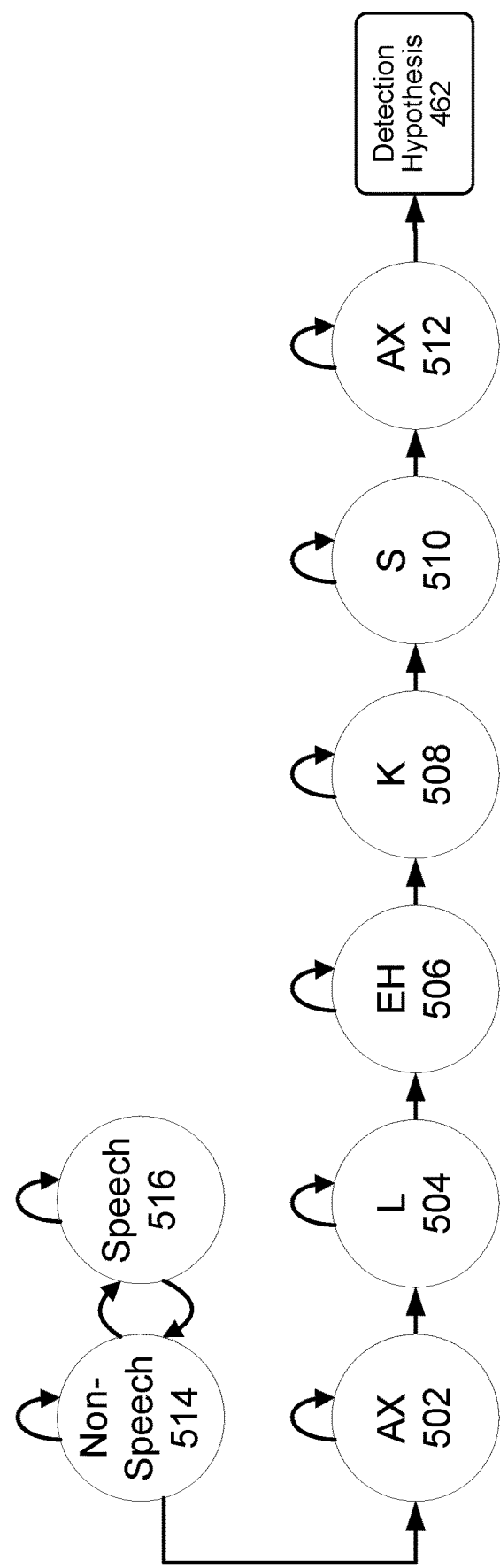
FIG. 5 illustrates a hidden-Markov model (HMM) wakeword-detection system according to embodiments of the present disclosure.

FIG. 5 illustrates a HMM for detecting a wakeword in accordance with embodiments of the present disclosure. As illustrated, the HMM detects the wakeword "Alexa," but one of skill in the art will understand that the HMM can be used to detect any. The HMM determines that the phonetic probabilities 458 indicate that a first sound or senone corresponding to the wakeword, "AX" 502, is present in the phonetic probabilities 458. The HMM may then determine that further senones corresponding to the wakeword, "L" 504, "EH" 506, "K" 508, "S" 510, and "AX" 512 are present in the phonetic probabilities 458 (in that order). Each senone may be represented in the HMM as a state; once the corresponding senone is detected, the HMM may advance to a next state. Upon determination of the last senone "AX" 512, the HMM may output the detection hypothesis 462 indicting a likelihood of detection of the wakeword. If an expected next senone is not detected (e.g., the audio contains one or more senones but not a next senone, the HMM may advance to a state corresponding to non-speech 514 or non-wakeword speech 516.

Figure 6:
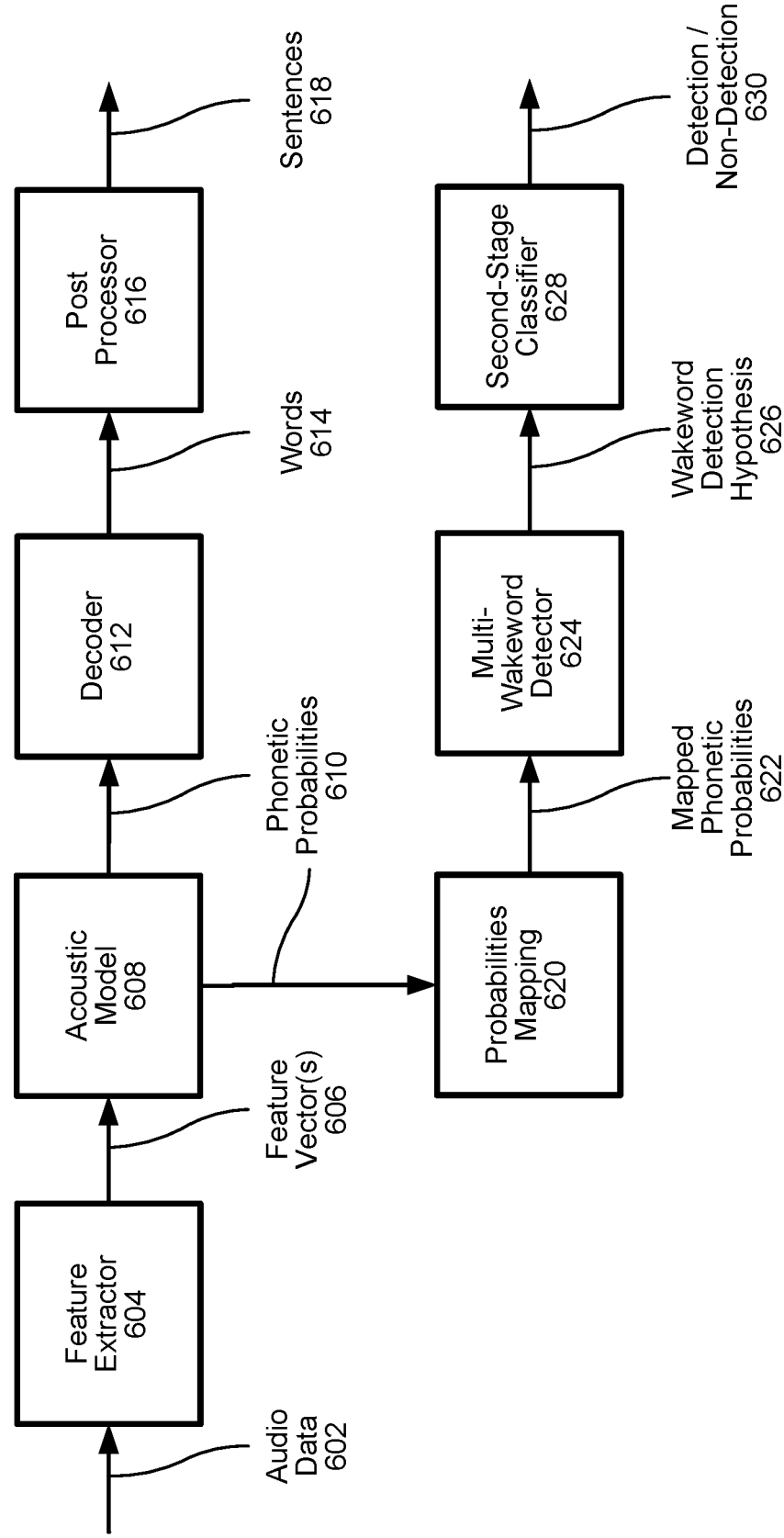
FIG. 6 illustrates a speech-recognition system according to embodiments of the present disclosure.

FIG. 6 illustrates a system for wakeword detection and ASR in accordance with embodiments of the present disclosure. As explained above with reference to FIGS. 4A and 4B, audio data 602 is received by a feature extractor 604, which may output one or more feature vectors 606. An acoustic model 608 generates phonetic probabilities 610 corresponding to the feature vectors 606. A decoder 612 may generate words 614 using the phonetic probabilities 610, and a post processor 616 may generate sentences 618 using the words 614.

In various embodiments, as mentioned above, a system for wakeword detection uses the same acoustic model 608 used by the ASR system. A probabilities mapping engine 620 maps the phonetic probabilities 610 to corresponding wakeword and non-wakeword targets, as explained in greater detail below with reference to FIG. 7. The probabilities mapping engine 620 may generate mapped phonetic probabilities 622, and a multi-wakeword detector 624 may detected one of a plurality of wakewords represented in the mapped phonetic probabilities 622 to create a wakeword detection hypothesis 626, as also explained in greater detail below. A second stage classifier 628 may generate a detection/non-detection decision based on the wakeword detection hypothesis 626. If the wakeword is detected, the decoder 612 may begin decoding the phonetic probabilities 610.

In various embodiments, the device 110 may behave differently depending on which wakeword is used. For example, in a multi-user environment, different users may use different wakewords, and the device 110 may tailor its operation in response to a particular user/wakeword matching. The device 110 may, for example, access a user profile associated with a particular wakeword and load device preferences or device usage history stored in the user profile. In other embodiments, a first wakeword may be associated with a first mode of operation of the device 110 and a second wakeword may be associated with a second mode of operation of the device 110. The first mode of operation may be, for example, a personal assistant, and the second mode of operation may be navigation (such as automobile navigation).

Figure 7:
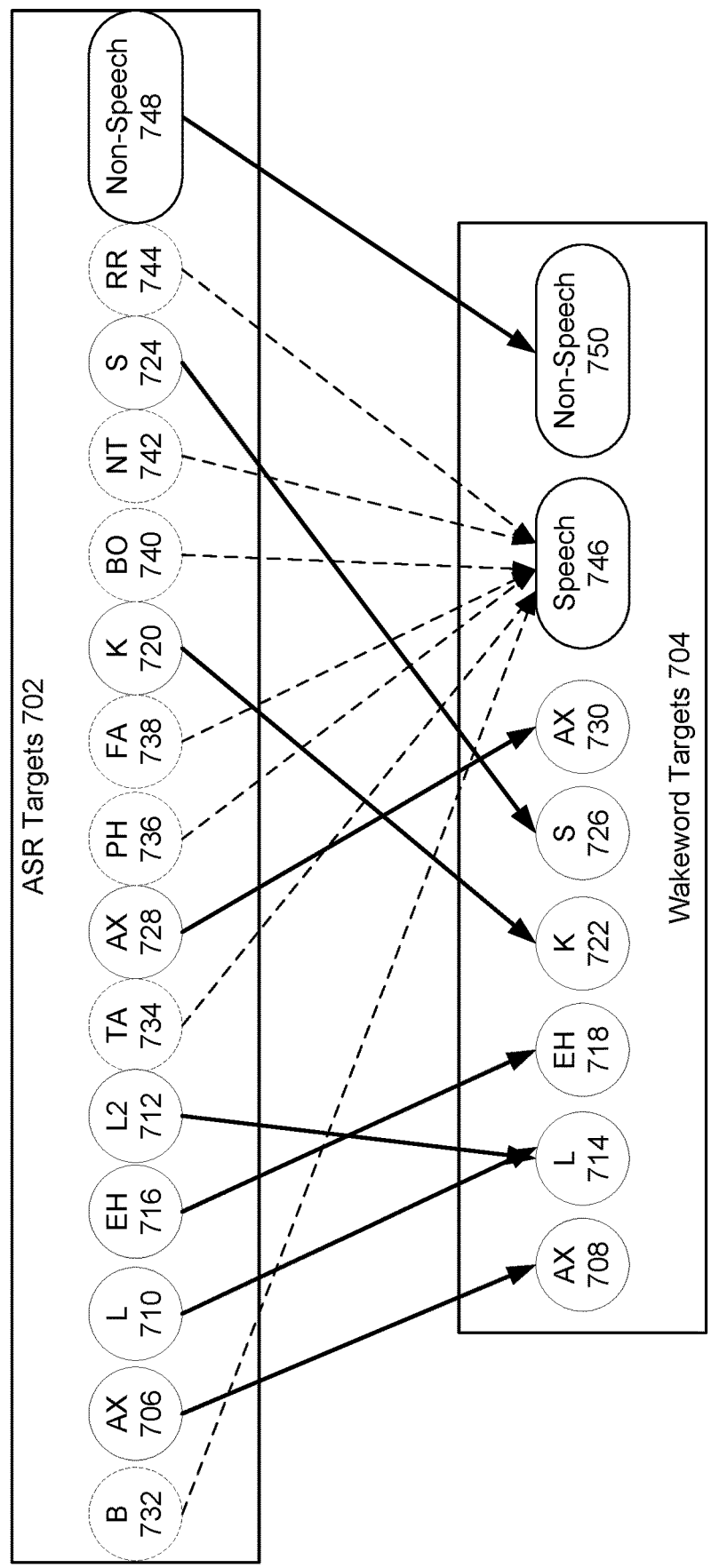
FIG. 7 illustrates a speech-target mapping system according to embodiments of the present disclosure.

FIG. 7 illustrates one embodiment of the probabilities mapping engine 620. The probabilities mapping engine 620 receives the phonetic probabilities 610 and maps some of the ASR targets 702 represented therein to one or more wakeword targets 704. The wakeword targets 704 may include a set of acoustic units, such as senones or phonemes, that are likely to be associated with a wakeword. For example, if the probabilities mapping engine 620 determines that a first senone "AX" 706 is present in the ASR targets 702, it may map that first senone to a corresponding senone "AX" 708. In some embodiments, more than one senone in the ASR targets 702 may be mapped to a senone in the wakeword targets 704 if, for example, the ASR targets 702 represent variations of the same wakeword target 704. For example, the probabilities mapping engine 620 may map two senones in the ASR targets 702—"L" 710 and "L2" 712—to the same wakeword target "L" 714. Similarly, the probabilities mapping engine 620 may map the ASR target "EH" 716 to the wakeword target "EH" 718, the target "K" 720 to the target "K" 722, the target "S" 724 to the target "S" 726, and another target "AH" 728 to the target "AH" 730. Senones in the ASR targets 702 that do not correspond to wakeword senones, such as targets "B" 732, "TA" 734, "PH" 736, "FA" 738, "BO" 740, "NT" 742, and "RR" 744, may be mapped by the probabilities mapping engine 620 to a speech target 746. The probabilities mapping engine 620 may map non-speech 748 in the ASR targets 702 to non-speech 750 in the wakeword targets 704. The probabilities mapping engine 620 may output the mapped wakeword targets 708, 714, 718, 722, 726, 730 as the mapped phonetic probabilities 622.

The mappings of the probabilities mapping engine 620 may be determined by user input; a user may, for example, input a list of which ASR targets 702 map to which wakeword targets 704. In other embodiments, the mappings may be determined by receiving a word, such as a new wakeword, and determining (using, for example, an encoder or decoder) senones corresponding to the word. The probabilities mapping engine 620 may thereafter identify the senones in the ASR targets 702 and create corresponding senones in the wakeword targets 704. By changing or adding to the mappings, a user may create a customized wakeword.

Although FIG. 7 illustrates wakeword targets 704 for only one wakeword, one of skill in the art will understand that multiple wakeword targets 704 may be used; one wakeword targets 704 may correspond to each multiple wakeword. The probabilities mapping engine 620 may thus map senones for multiple wakewords using the ASR targets 702 in parallel.

Figure 8:
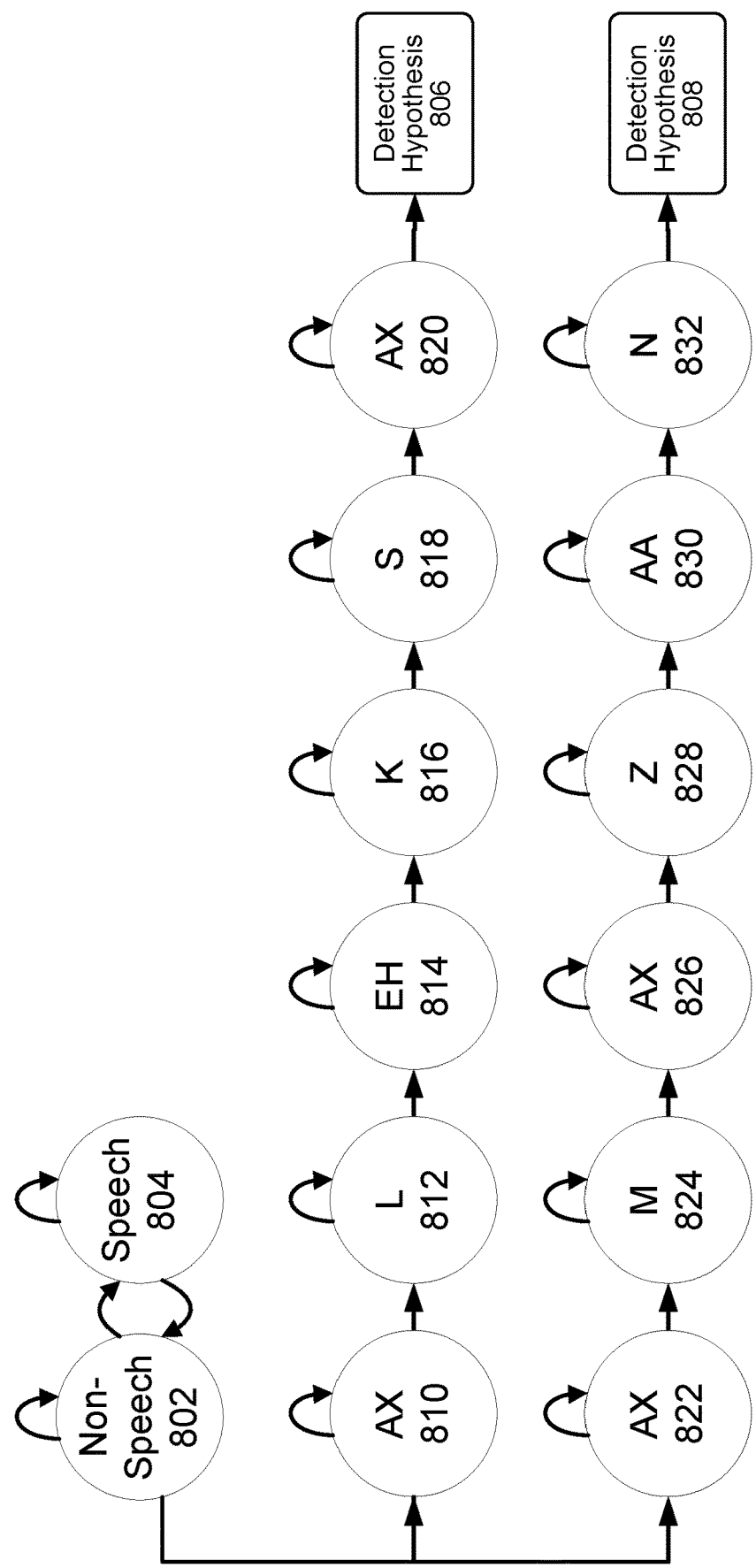
FIG. 8 illustrates a multi-wakeword HMM wakeword-detection system according to embodiments of the present disclosure.

FIG. 8 illustrates a HMM for detecting multiple wakewords in accordance with embodiments of the present disclosure. As explained above, the HMM may determine which senones corresponding to a wakeword and which senones correspond to non-speech 802 or non-wakeword speech 804. As illustrated, the HMM may detect two wakewords—"Alexa" and "Amazon"—but the present disclosure is not limited to only two wakewords or to only those wakewords. In some embodiments, a single HMM has multiple wakeword paths to determine the wakewords. As explained above, the HMM may move through states corresponding to senones when those senones are detected in audio data to determine a first detection hypothesis 806 corresponding to a first wakeword and a second detection hypothesis 808 corresponding to a second wakeword. The senones corresponding to the first wakeword may be "AX" 810, "L" 812, "EH" 814, "K" 816, "S" 818, and "AX" 820. The senones corresponding to the second wakeword may be "AX" 822, "M" 824, "AX" 826, "Z" 828, "AA" 830, and "N" 832. The detection hypothesis may be determined in accordance with the below equation (1).

$$\underset{i:\log(\frac{f_i}{b})>\theta_i}{\mathrm{argmax}} \ \log\frac{f_i}{b} \quad (1)$$

In equation (1), $f_i$ is the probability of the foreground path for a wakeword i, b the probability of the common background path, and $\theta_i$ is the corresponding threshold of the log-likelihood ratio.

Figure 9:
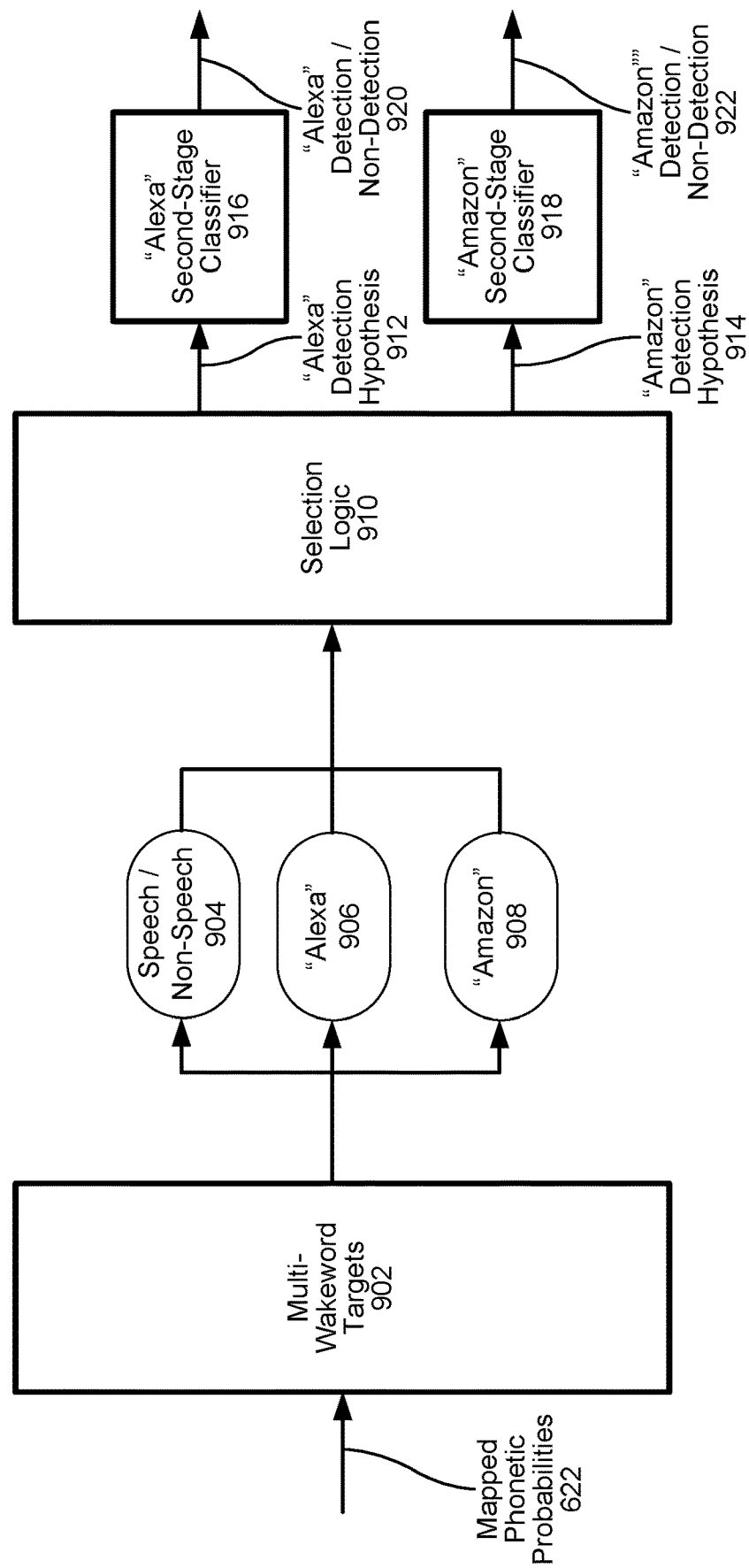
FIG. 9 illustrates a multi-wakeword wakeword-detection system according to embodiments of the present disclosure.

FIG. 9 illustrates using the HMM of FIG. 8 to determine detection or non-detection of multiple wakewords. A multi-wakeword phone target engine 902 receives the mapped phonetic probabilities 622 and outputs them to the HMM of FIG. 8 which, as described above, may determine the mapped phonetic probabilities 622 correspond to speech/non-speech 904, to a first wakeword "Alexa" 906, or to a second wakeword "Amazon" 908. Based on detecting at least one wakeword, selection logic 910 sends a detection hypothesis—such as an "Alexa" detection hypothesis 912 and/or an "Amazon" detection hypothesis 914—to a corresponding second-stage classifier—such as an "Alexa" second-stage classifier 916 or an "Amazon" second-stage classifier 918. Based on the detection hypothesis, the classifiers 916, 918 may output a decision of detection or of non-detection, such as "Alexa" 920 detection/non-detection or "Amazon" detection/non-detection 922.

Figure 10:
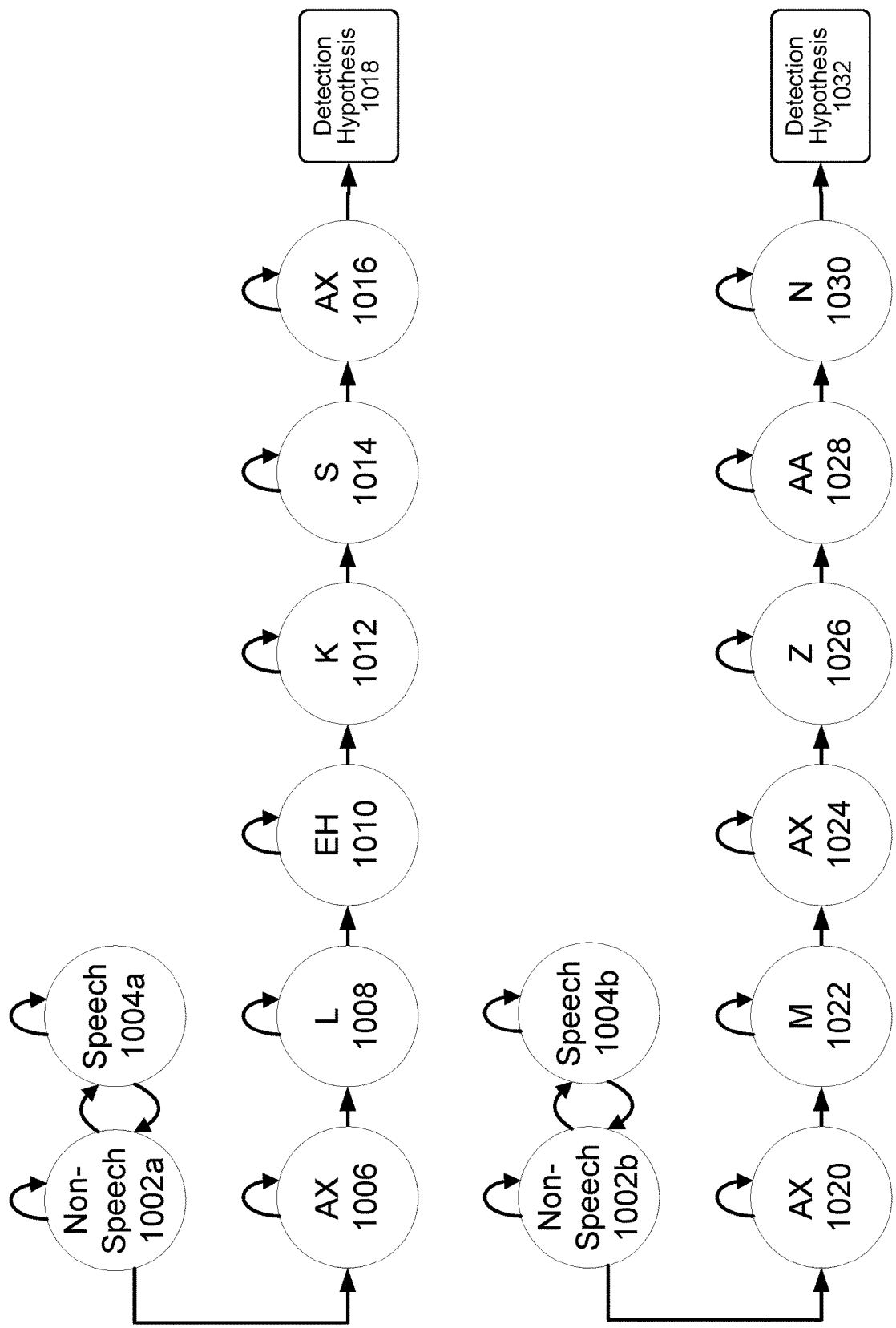
FIG. 10 illustrates a multi-wakeword HMM wakeword-detection system according to embodiments of the present disclosure.

FIG. 10 illustrates a HMM system for detecting multiple wakewords in accordance with embodiments of the present disclosure. In these embodiments, instead of the multi-path HMM described with reference to FIG. 8, multiple HMMs are used—one HMM for each wakeword. A first HMM may be used to detect a first wakeword (for example, "Alexa") and a second HMM may be used to detect a second wakeword (for example, "Amazon"). Each HMM may distinguish between the wakeword, non-speech 1002a, 1002b, and speech 1004a, 1004b. The first HMM may determine that senones corresponding to the first wakeword, including "AX" 1006, "L" 1008, "EH" 1010, "K" 1012, "S" 1014, and "AX" 1016, are present in the audio data and output a corresponding detection hypothesis 1018. Similarly, a second HMM may determine that senones corresponding to the first wakeword, including "AX" 1020, "M" 1022, "AX" 1023, "Z" 1026, "AA" 1028, and "N" 1030 are present in the audio data and output a corresponding detection hypothesis 1032. The detection hypothesis may be determined in accordance with the below equation (2).

$$\operatorname*{argmax}_{i:\log\left(\frac{f_i}{b_i}\right)>\theta_i} \log\frac{f_i}{b_i} \qquad (2)$$

In equation (2), $f_i$ is the probability of the foreground path for a wakeword i, $b_i$ the probability of the background path for a wakeword i, and $\theta_i$ is the corresponding threshold of the log-likelihood ratio.

Figure 11:
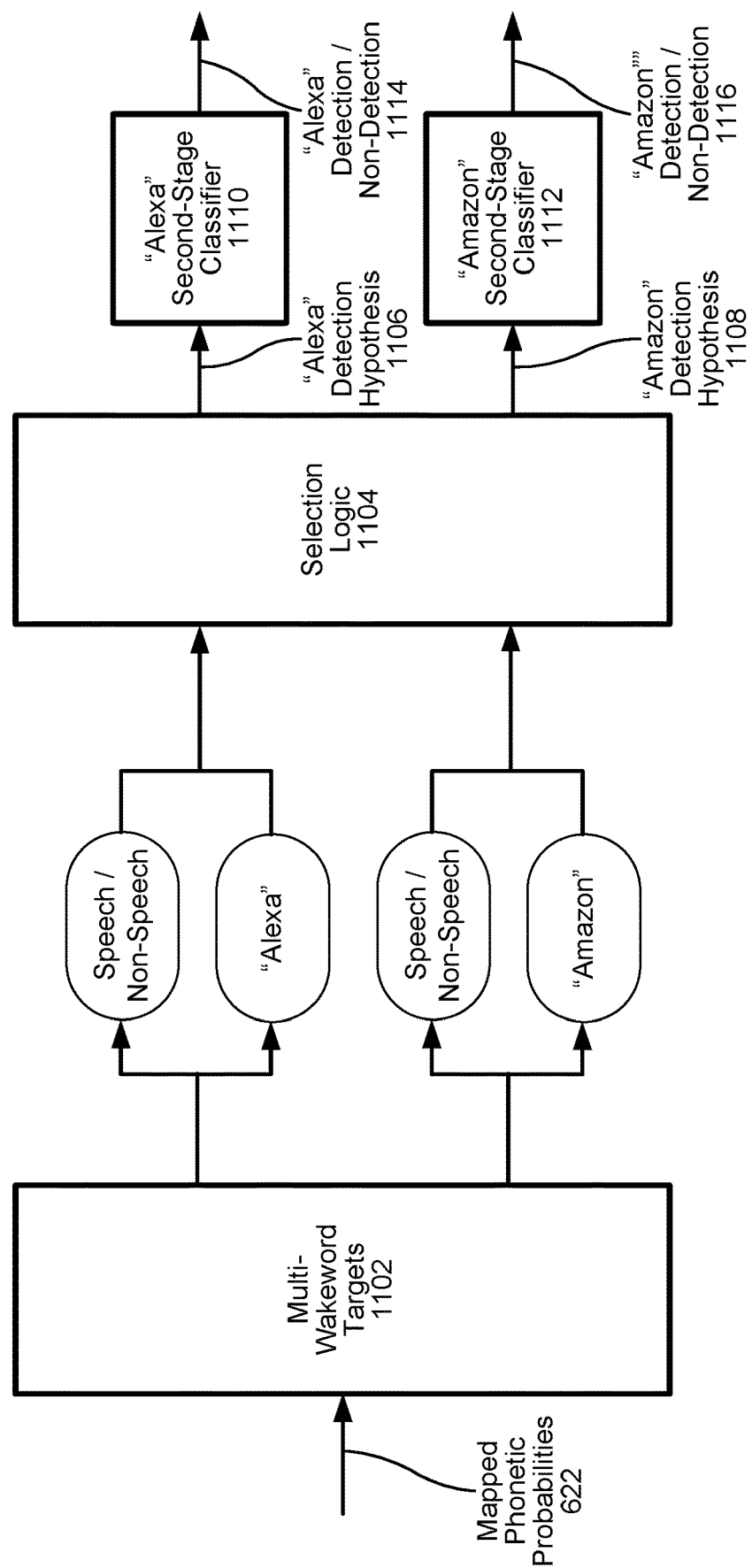
FIG. 11 illustrates a multi-wakeword wakeword-detection system according to embodiments of the present disclosure.

FIG. 11 illustrates using the HMM system of FIG. 10 to determine detection or non-detection of multiple wakewords. A multi-wakeword phone target engine 1102 receives the mapped phonetic probabilities 622 and outputs them to the HMM of FIG. 10 which, as described above, may determine the mapped phonetic probabilities 622 correspond to speech/non-speech, to a first wakeword "Alexa", or to a second wakeword "Amazon." Based on detecting at least one wakeword, selection logic 1104 sends a detection hypothesis—such as an "Alexa" detection hypothesis 1106 and/or an "Amazon" detection hypothesis 1108—to a corresponding second-stage classifier—such as an "Alexa" second-stage classifier 1110 or an "Amazon" second-stage classifier 1112. Based on the detection hypothesis, the classifiers 1110, 1112 may output a decision of detection or of non-detection, such as "Alexa" 1114 detection/non-detection or "Amazon" detection/non-detection 1116.

Figure 12:
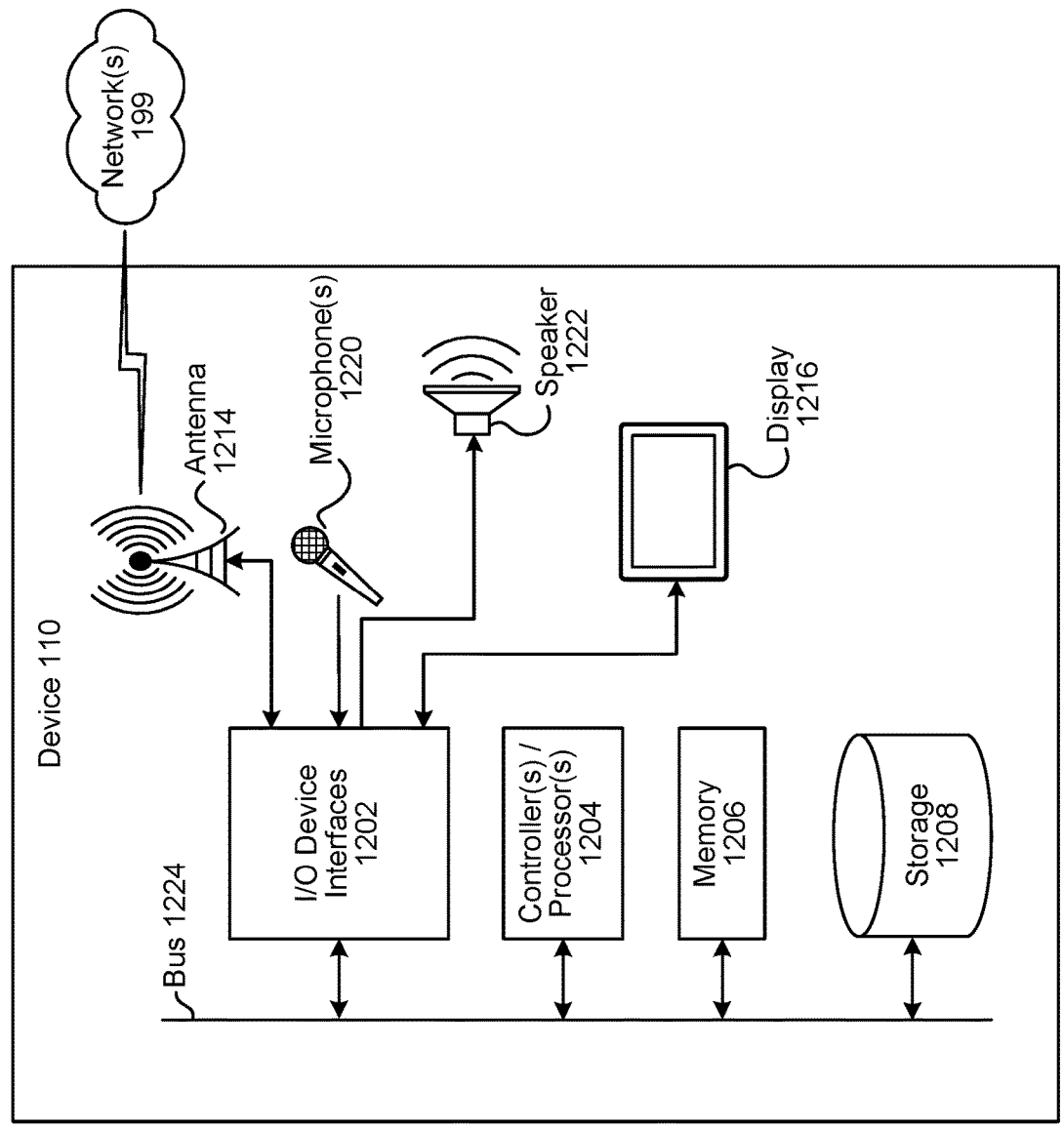
FIG. 12 is a block diagram conceptually illustrating example components of a device according to embodiments of the present disclosure.
Figure 13:
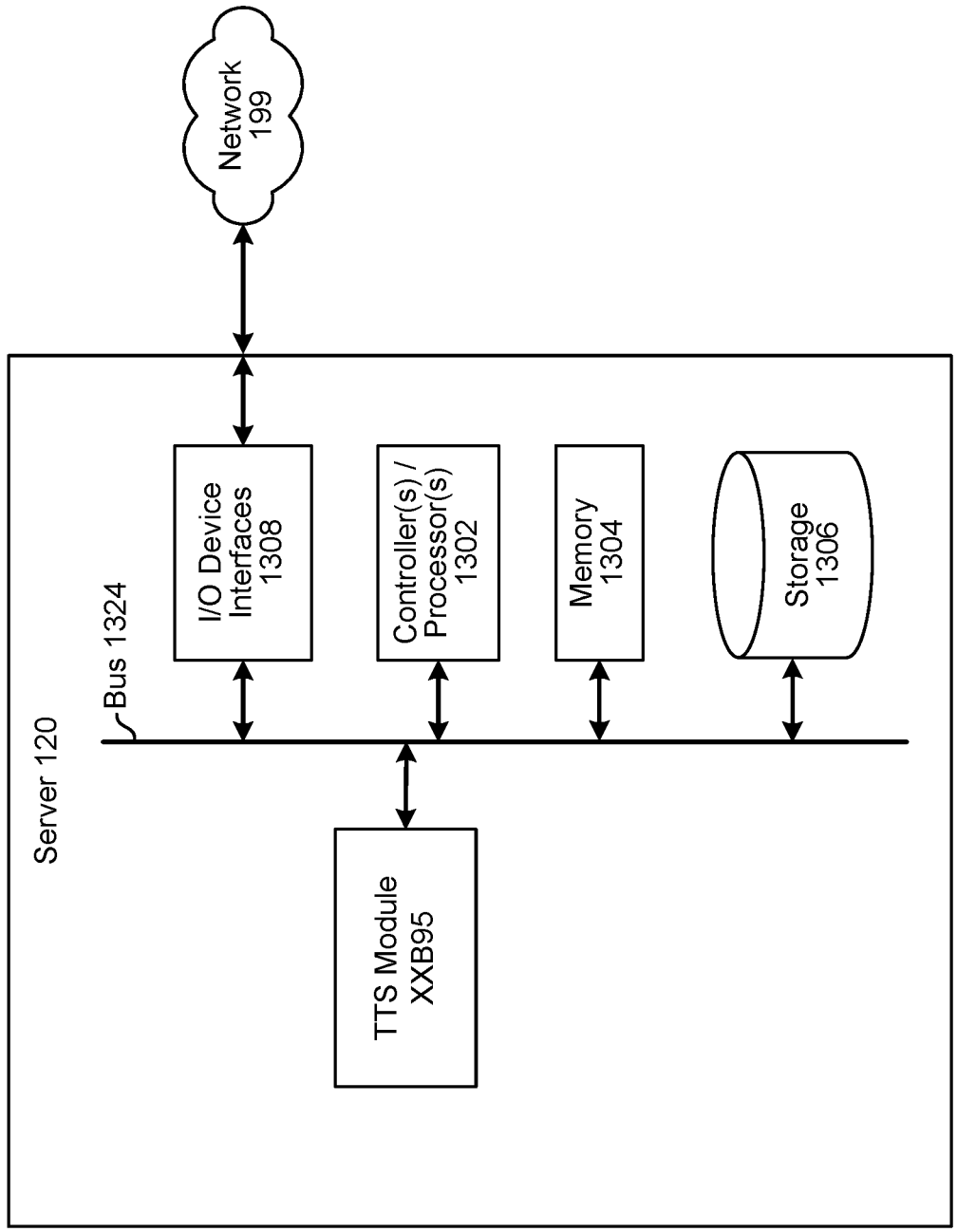
FIG. 13 is a block diagram conceptually illustrating example components of a server according to embodiments of the present disclosure.

FIG. 12 is a block diagram conceptually illustrating a device 110 that may be used with the system. FIG. 13 is a block diagram conceptually illustrating example components of a remote device, such as the server(s) 120, which may assist with ASR processing, NLU processing, etc. Multiple servers 120 may be included in the system, such as one or more servers 120 for performing ASR, one or more servers 120 for performing NLU, etc. In operation, each of these devices (or groups of devices) may include computer-readable and computer-executable instructions that reside on the respective device (110/120), as will be discussed further below.

Each device (110/120) may include one or more controllers/processors (1204/1304), which may each include a central processing unit (CPU) for processing data and computer-readable instructions, and a memory (1206/1306) for storing data and instructions of the respective device. The memories (1206/1306) may individually include volatile random access memory (RAM), non-volatile read only memory (ROM), non-volatile magnetoresistive memory (MRAM), and/or other types of memory. Each device (110/120) may also include a data storage component (1208/1308) for storing data and controller/processor-executable instructions. Each data storage component (1208/1308) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (1202/1302).

Computer instructions for operating each device (110/120) and its various components may be executed by the respective device's controller(s)/processor(s) (1204/1304), using the memory (1206/1306) as temporary "working" storage at runtime. A device's computer instructions may be stored in a non-transitory manner in non-volatile memory (1206/1306), storage (1208/1308), or an external device(s). Alternatively, some or all of the executable instructions may be embedded in hardware or firmware on the respective device in addition to or instead of software.

Each device (110/120) includes input/output device interfaces (1202/1302). A variety of components may be connected through the input/output device interfaces (1202/1302), as will be discussed further below. Additionally, each device (110/120) may include an address/data bus (1224/1324) for conveying data among components of the respective device. Each component within a device (110/120) may also be directly connected to other components in addition to (or instead of) being connected to other components across the bus (1224/1324).

Referring to FIG. 12, the device 110 may include input/output device interfaces 1202 that connect to a variety of components such as an audio output component such as a speaker 1222, a wired headset or a wireless headset (not illustrated), or other component capable of outputting audio. The device 110 may also include an audio capture component. The audio capture component may be, for example, a microphone 1220 or array of microphones, a wired headset or a wireless headset (not illustrated), etc. The device 110 may additionally include a display 1216 for visually presenting content.

Via antenna(s) 1214, the input/output device interfaces 1202 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1202/1302) may also include communication components that allow data to be exchanged between devices such as different physical servers in a collection of servers or other components.

The components of the device 110 and the server(s) 120 may include their own dedicated processors, memory, and/or storage. Alternatively, one or more of the components of the device 110 and the server(s) 120 may utilize the I/O interfaces (1202/1302), processor(s) (1204/1304), memory (1206/1306), and/or storage (1208/1308) of the device 110 and server(s) 120, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110 and the server(s) 120, as described herein, are illustrative, and may be located as a stand-alone device or may be included, in whole or in part, as a component of a larger device or system.

As illustrated in FIG. 14, multiple devices (110a-110g, 120) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a speech-detection and display device 110f, and/or a smart TV 110g may be connected to the network(s) 199 through a wireless service provider, over a WiFi or cellular network connection, or the like. Other devices are included as network-connected support devices, such as the server(s) 120, skill server(s) 125, or others. The support devices may connect to the network(s) 199 through a wired connection or wireless connection.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving, from at least one microphone, first audio data representing first audio, the first audio data representing a first wakeword and a first command following the first wakeword;
determining, using a feature-extraction model, first audio features representing the first audio data;
determining, using an acoustic model and the first audio features, first senone data representing a first set of senones in the first audio;
sending the first senone data to a first component;
prior to completion of processing by the first component related to the first senone data, sending the first senone data to a second component that does not receive output data from the first component;
determining, using the first component and based at least in part on the first senone data, that the first set of senones includes a first subset of senones corresponding to the first wakeword;
processing the first senone data using the second component to identify at least one sequence of senones corresponding to at least one word;

determining that the at least one word corresponds to the first command; and executing the first command.

2. The computer-implemented method of claim 1, further comprising:

receiving, from the at least one microphone, second audio data representing second audio, the second audio data received after the first audio data and representing a second wakeword and a second command following the second wakeword;

determining, using the feature-extraction model, second audio features representing the second audio data;

determining, using the acoustic model and the second audio features, second senone data representing a second set of senones represented in the second audio;

sending the second senone data to a first component;

prior to completion of processing by the first component related to the second senone data, sending the second senone data to a second component that does not receive output data from the first component;

determining, using the first component, that the second set of senones includes a second subset of senones corresponding to the second wakeword, the second wakeword being different from the first wakeword;

processing the second senone data using the second component;

determining that the second set of senones includes at least one third subset of senones corresponding to the second command; and executing the second command.

3. The computer-implemented method of claim 2, further comprising:

receiving, from a user, wakeword data corresponding to the second wakeword;

determining an automatic-speech recognition target corresponding to the wakeword data; and determining that the automatic-speech recognition target corresponds to a wakeword target, wherein determining that second set of senones includes the second subset of senones comprises determining that the second subset of senones corresponds to the wakeword target.

4. The computer-implemented method of claim 2, further comprising:

determining that a first path of a hidden Markov model corresponds to the first wakeword, and determining that a second path of the hidden Markov model corresponds to the second wakeword.

5. A computer-implemented method comprising:

determining first audio characteristic data corresponding to first audio data, the first audio data representing a first wakeword and a first command following the first wakeword;

determining, using an acoustic model and the first audio characteristic data, first data representing a first set of acoustic units represented in the first audio data;

sending the first data to a first component;

prior to completion of processing by the first component related to the first data, sending the first data to a second component that does not receive output data from the first component;

determining, using the first component and based at least in part on the first data, that the first set of acoustic units includes a first subset of acoustic units corresponding to the first wakeword;

processing the first data using the second component to identify at least one sequence of acoustic units corresponding to at least one word;

determining that the at least one word corresponds to the first command; and executing the first command.

6. The computer-implemented method of claim 5, further comprising:

determining second audio characteristic data corresponding to second audio data, the second audio data representing a second wakeword received after the first wakeword;

determining, using the acoustic model and the second audio characteristic data, second data representing a second set of acoustic units represented in the second audio data;

sending the second data to the first component;

prior to receiving output data from the first component related to the second data, sending the second data to the second component;

determining, using the first component, that the second set of acoustic units includes a third subset of acoustic units corresponding to the second wakeword; and processing the second data using the second component.

7. The computer-implemented method of claim 6, further comprising:

determining that a user profile is associated with the second wakeword and that the user profile is not associated with the first wakeword; and after determining that the second set of acoustic units includes the third subset of acoustic units, configuring a device in accordance with the user profile.

8. The computer-implemented method of claim 6, wherein:

determining that the first set of acoustic units includes the first subset of acoustic units comprises determining that a first path of a hidden Markov model corresponds to the first wakeword, and determining that the second set of acoustic units includes the third subset of acoustic units comprises determining that a second path of the hidden Markov model corresponds to the second wakeword.

9. The computer-implemented method of claim 8, further comprising:

determining a first probability ratio corresponding to a first probability that the first audio data represents the first wakeword with respect to a background probability of a background path of the hidden Markov model;

determining a second probability ratio corresponding to a second probability that the second audio data represents the second wakeword with respect to the background probability; and determining the second probability ratio is greater than the first probability ratio.

10. The computer-implemented method of claim 6, wherein:

determining that the first set of acoustic units includes the first subset of acoustic units comprises determining that a first path of a first hidden Markov model corresponds to the first wakeword, and determining that the second set of acoustic units includes the third subset of acoustic units comprises determining that a second path of a second hidden Markov model corresponds to the second wakeword.

11. The computer-implemented method of claim 5, further comprising:

determining second audio characteristic data corresponding to second audio data;

determining, at a second time and using the acoustic model and the second audio characteristic data, second data representing a second set of acoustic units represented in the second audio data;

sending the second data to the first component;

prior to receiving output data from the first component related to the second data, sending the second data to the second component;

determining, using the first component, that the second set of acoustic units lacks a third subset of acoustic units corresponding to the first wakeword; and determining, based at least in part on the second set of acoustic units lacking the third subset of acoustic units, that the second audio data represents non-wakeword speech.

12. The computer-implemented method of claim 5, wherein the first component comprises a wakeword detection component and the second component comprises an automatic speech recognition (ASR) component.

13. A system comprising:

at least one processor; and at least one memory including instructions that, when executed by the at least one processor, cause the system to:

determine first audio characteristic data corresponding to first audio data, the first audio data representing a first wakeword and a first command following the first wakeword, determine, using an acoustic model and the first audio characteristic data, first data representing a first set of acoustic units represented in the first audio data, send the first data to a first component, prior to completion of processing by the first component related to the first data, sending the first data to a second component that does not receive output data from the first component, determine, using the first component and based at least in part on the first data, that the first set of acoustic units includes a first subset of acoustic units corresponding to the first wakeword, process the first data using the second component to identify at least one sequence of acoustic units corresponding to at least one word, determine that the at least one word corresponds to the first command, and execute the first command.

14. The system of claim 13, wherein the at least one memory further includes instructions that, when executed by the at least one processor, further cause the system to:

determine second audio characteristic data corresponding to second audio data, the second audio data representing a second wakeword received after the first wakeword;

determine, using the acoustic model and the second audio characteristic data, second data representing a second set of acoustic units represented in the second audio data;

send the second data to the first component;

prior to receiving output data from the first component related to the second data, send the second data to the second component;

determine, using the first component, that the second set of acoustic units includes a third subset of acoustic units corresponding to the second wakeword; and process the second data using the second component.

15. The system of claim 14, wherein the at least one memory further includes instructions that, when executed by the at least one processor, further cause the system to:

determine that a user profile is associated with the second wakeword and that the user profile is not associated with the first wakeword; and after determining that the second set of acoustic units includes the third subset of acoustic units, configure a device in accordance with the user profile.

16. The system of claim 14, wherein the at least one memory further includes instructions that, when executed by the at least one processor, further cause the system to:

determine that the first set of acoustic units includes the first subset of acoustic units at least in part by determining that a first path of a hidden Markov model corresponds to the first wakeword, and determine that the second set of acoustic units includes the third subset of acoustic units at least in part by determining that a second path of the hidden Markov model corresponds to the second wakeword.

17. The system of claim 16, wherein the at least one memory further includes instructions that, when executed by the at least one processor, further cause the system to:

determine a first probability ratio corresponding to a first probability that the first audio data represents the first wakeword with respect to a background probability of a background path of the hidden Markov model;

determine a second probability ratio corresponding to a second probability that the second audio data represents the second wakeword with respect to the background probability; and determine the second probability ratio is greater than the first probability ratio.

18. The system of claim 14, wherein the at least one memory further includes instructions that, when executed by the at least one processor, further cause the system to:

determine that the first set of acoustic units includes the first subset of acoustic units at least in part by determining that a first path of a first hidden Markov model corresponds to the first wakeword, and determine that the second set of acoustic units includes the third subset of acoustic units at least in part by determining that a second path of a second hidden Markov model corresponds to the second wakeword.

19. The system of claim 13, wherein the at least one memory further includes instructions that, when executed by the at least one processor, further cause the system to:

determine second audio characteristic data corresponding to second audio data received after the first audio data;

determine, using the acoustic model and the second audio characteristic data, second data representing a second set of acoustic units represented in the second audio data;

send the second data to the first component;

prior to receiving output data from the first component related to the second data, send the second data to the second component;

determine, using the first component, that the second set of acoustic units lacks a third subset of acoustic units corresponding to the first wakeword; and determine, based at least in part on the second set of acoustic units lacking the third subset of acoustic units, that the second audio data includes non-wakeword speech.

* * * * *